(12) United States Patent
Sammons (10) Patent No.: US 10,189,382 B2
(45) Date of Patent: Jan. 29, 2019

(54) VEHICLE SEAT ASSEMBLY

(71) Applicant: Nissan North America, Inc., Franklin, TN (US)

(72) Inventor: Justin Sammons, Southgate, MI (US)

(73) Assignee: Nissan North America, Inc., Franklin, TN (US)

(*) Notice: Subject to any disclaimer, the term of this patent is extended or adjusted under 35 U.S.C. 154(b) by 159 days.

(21) Appl. No.: 15/251,629

(22) Filed: Aug. 30, 2016

(65) Prior Publication Data

US 2018/0056820 A1    Mar. 1, 2018

(51) Int. Cl.
*B60N 2/28*    (2006.01)
*B60N 2/90*    (2018.01)

(52) U.S. Cl.
CPC ......... *B60N 2/2893* (2013.01); *B60N 2/2887* (2013.01); *B60N 2/90* (2018.02)

(58) Field of Classification Search
CPC ........ B60N 2/28; B60N 2/2887; B60N 2/289; B60N 2/2893; B60N 2/646; B60N 2/90
USPC ..................................... 297/250.1, 253, 254
See application file for complete search history.

(56) References Cited

U.S. PATENT DOCUMENTS

| | | | | |
|---|---|---|---|---|
| 9,604,555 | B2* | 3/2017 | Fujikake | B60N 2/289 |
| 2002/0104190 | A1* | 8/2002 | Moore | B60N 2/2809 |
| | | | | 16/231 |
| 2015/0084388 | A1* | 3/2015 | Arai | B60N 2/6009 |
| | | | | 297/250.1 |
| 2018/0001808 | A1* | 1/2018 | Yamauchi | B60N 2/64 |
| 2018/0065512 | A1* | 3/2018 | Wieczorek | B60N 2/2893 |

FOREIGN PATENT DOCUMENTS

| | | |
|---|---|---|
| DE | 10044621 C1 | 2/2002 |
| DE | 102009036726 A1 * | 2/2011 ........... B60N 2/2887 |

OTHER PUBLICATIONS

Cristina Echemendia, NHTSA's Research & Rulemaking Activities on Child Passenger Safety, Government Industry Meeting 2015, Jan. 22, 2015, NHTSA, Washington, D.C., U.S.A.
Vehicle LATCH Hardware Evaluation Protocol (Version II), Nov. 2015, Insurance Institute for Highway Safety, Virginia, U.S.A.
IIHS LATCH Measurement Tool Set Drawings, Mar.-Jun. 2015, Insurance Institute for Highway Safety Highway Loss Data Institute, Virginia, U.S.A.

* cited by examiner

*Primary Examiner* — Ryan D Kwiecinski
(74) *Attorney, Agent, or Firm* — Global IP Counselors, LLP (57) ABSTRACT

A vehicle seat assembly having a seat portion, a tether wire and a tether cover assembly. The seat portion has a passenger receiving surface with at least a portion of the passenger receiving surface coinciding with a first plane. A resilient cushioning material of the seat portion defines a recessed area open to the passenger receiving surface. The tether wire for securing child seat is located within the recess. The tether cover assembly has a housing defining a door opening, a first door and a second door installed within the recessed area. The first and second doors are pivotal about respective first and second pivot axes for movement between respective closed positions concealing the tether wire, and open positions exposing the tether wire. In their respective closed positions the first and second doors coincide with or are parallel to the first plane.

20 Claims, 5 Drawing Sheets

VEHICLE SEAT ASSEMBLY

BACKGROUND

Field of the Invention

The present invention generally relates to a vehicle seat assembly that includes a tether wire for securing, for example, a child's or infant's seat. More specifically, the present invention relates to a vehicle seat assembly that includes a tether cover assembly that conceals the tether wire of the vehicle seat assembly when the tether wire is not in use.

Background Information

A rear seat assembly of a vehicle includes at least one wire tether that is a rigid part of the frame structure of the rear seat assembly. The wire tether is designed for the purpose of securing a child's or infant's seat installed on the rear seat assembly. The wire tether is a rigid member that can be approximately 6 mm in diameter. Typically, the wire tether is concealed between a horizontal portion of the seat and a vertical upright portion of the seat assembly. New proposed regulations suggest locating the tether wire within a recess formed in a lower portion of the upright portion of the seat assembly.

SUMMARY

One object of the present disclosure is to provide a vehicle seat assembly with a tether cover assembly that includes pivoting doors that conceals a tether wire when in a closed position and provides easy access to the tether wire in an open position.

In view of the state of the known technology, one aspect of the present disclosure is to provide a vehicle seat assembly with a seat portion, a tether wire and a tether cover assembly. The seat portion has a passenger receiving surface configured and shaped to contact a portion of a passenger seated there-against. At least a portion of the passenger receiving surface coincides with a first plane. The seat portion has a resilient cushioning material disposed therein with a recessed area being defined within the resilient cushioning material that is open to the passenger receiving surface. The tether wire is located within the recessed area and is configured to secure child seat thereto. The tether cover assembly has a housing defining a door opening, a first door and a second door. The first door is pivotal about a first pivot axis and the second door is pivotal about a second axis between respective closed positions concealing the tether wire and the door opening and open positions exposing the tether wire and the door opening. The housing is installed within the recessed area such that with the doors in their respective closed positions the first and second doors coincide with or are parallel to the first plane.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
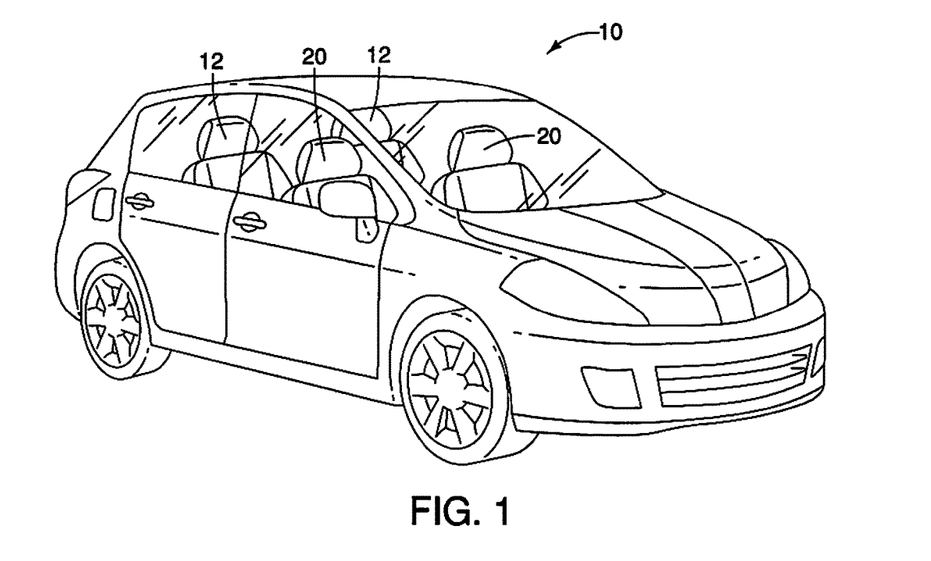
FIG. 1 is a perspective view of a vehicle having front seats and rear seats in accordance with a first embodiment.

Referring initially to FIG. 1, a vehicle 10 having a rear seat 12 that includes a tether wire 14 (FIG. 4) for securing a child's seat is illustrated in accordance with a first embodiment. The rear seat 12 further includes a tether cover assembly 16 (FIGS. 2-4) that conceals the tether wire 14 in a manner described in greater detail below.

The vehicle 10 is a conventional vehicle and can be a four door sedan, as depicted in FIG. 1, or can alternatively be a coupe, a sports utility vehicle (SUV), pick-up truck with a crew seat behind a front row of seats or a luxury sedan. In other words, the rear seat 12 described in greater detail can be installed in any of a variety of vehicle designs and configurations and is not limited to the four door sedan depicted in FIG. 1.

The vehicle 10 includes a front row of seats 20 and the rear seats 12. Currently, tether wires such as the tether wire 14 are installed to or within the structure of the rear seats 12. However, it should be understood from the drawings and the description herein that it is possible to include at least one of the tether wires 14 in one or both of the front seats 20, and further provide the front seats 20 with the tether cover assembly 16 in a manner described further below with reference to the rear seats 12.

Figure 2:
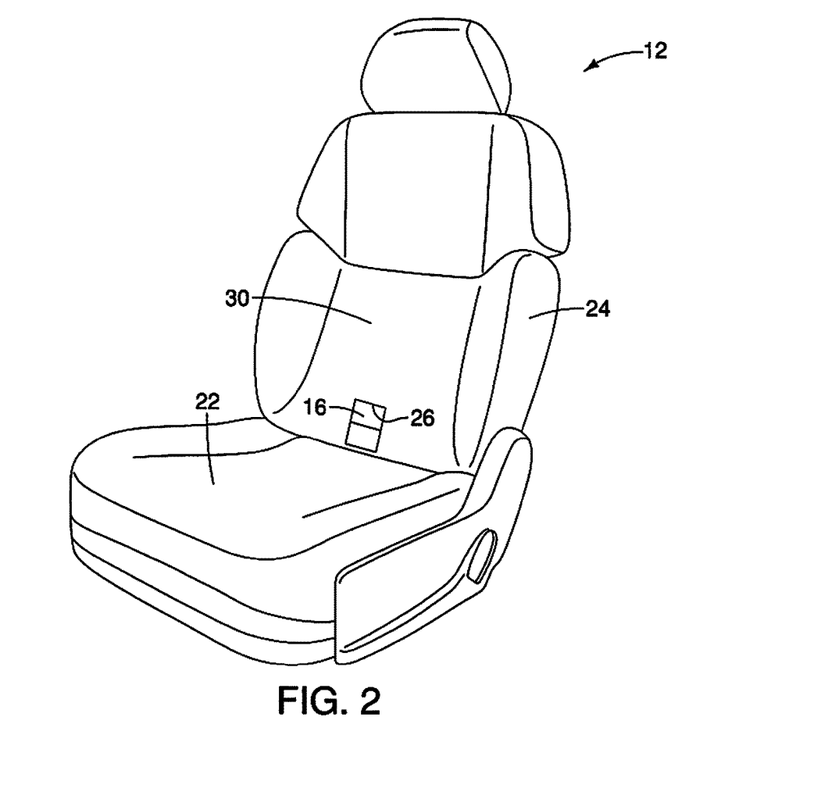
FIG. 2 is a perspective view of one of the rear seats removed from the vehicle depicted in FIG. 1, showing a tether cover assembly that conceals a tether wire in accordance with the first embodiment.
Figure 3:
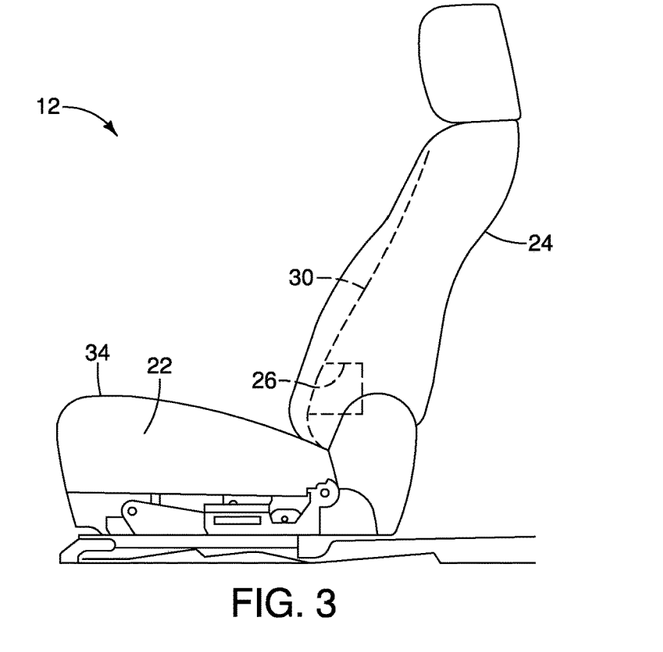
FIG. 3 is a side view of the rear seat depicted in FIG. 2 showing details of the tether cover assembly in accordance with the first embodiment.

A description of the rear seat 12 is now provided with specific reference to FIGS. 2 and 3. The vehicle 10 is provided with at least two rear seats 12. In the depicted embodiment, the two rear seats 12 are each single passenger seats, sometimes referred to as bucket seats. However, it should be understood from the drawings and the description herein that the tether wire 14 and the tether cover assembly 16 can alternatively be installed to a bench-style rear seat. Since the rear seats 12 are generally the same as one another, a description of only one rear seat 12 is provided for the sake of brevity. It should be understood from the description and drawings that a description of one of the rear seats 12 applies equally to both of the rear seats 12, as well as front seats 20 within the vehicle 10.

Figure 4:
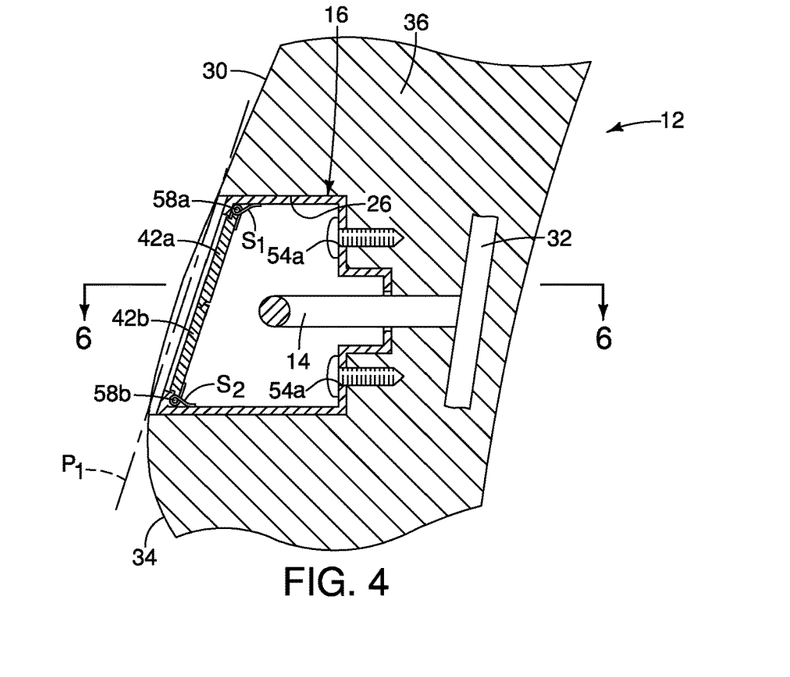
FIG. 4 is a side cross-sectional view of a portion of the rear seat depicted in FIGS. 2 and 3, showing a housing and doors of the tether cover assembly installed within the seat surrounding a tether wire with the doors in a closed position in accordance with the first embodiment.

As shown in FIGS. 2 and 3, the seat assembly 12 includes a lower cushion portion 22 and an upright cushion portion 24. A lower end of the upright cushion portion 24 includes a recessed area 26. The upright cushion portion 24 (a seat portion) defines a passenger receiving surface 30 that is configured and shaped to contact a portion of a passenger (not shown) seated there-against. In FIGS. 2, 3 and 4, the passenger receiving surface 30 is provided with a very specific overall shape and contour. It should be understood from the drawings and the description herein that the depicted shape of the passenger receiving surface 30 is just one example of surfaces of the upright cushion portion 24. The passenger receiving surface 30 can be provided with alternative overall shapes and contours that differ from those depicted.

In the depicted embodiment, the passenger receiving surface 30 is shown as a generally upright or upwardly extending surface that the passenger leans back against while riding in the vehicle 10. At least a lower portion of the passenger receiving surface 30 defines and/or coincides with a first plane $P_1$. The first plane $P_1$ is inclined relative to a vertical direction. However, it should be understood from the drawing and the description herein that the orientation of the first plane $P_1$ is also a function of the positioning of the upright cushion portion 24. Specifically, the upright cushion portion 24 can be configured for inclined displacement, depending upon the vehicle design and seat design. Since the first plane Pi is defined relative to the passenger receiving surface 30, when the passenger receiving surface 30 is angularly repositioned with inclining movement of the upright cushion portion 24, the first plane $P_1$ is similarly inclined. Further, if the upright cushion portion 24 is moved to a more vertical orientation, the first plane $P_1$ can also be oriented to be vertical.

The first plane $P_1$ is defined as being geometrically normal to curvature of the passenger receiving surface 30 of the upright cushion portion 24 at a location approximately level with the tether wire 14 (with the passenger receiving surface 30 in a generally upright orientation, such as that shown in FIG. 4). Alternatively, the first plane $P_1$ can be defined by upper and lower edges of the recessed area 26, as indicated in FIG. 4.

The upright cushion portion 24 includes a metallic frame 32 (partially shown in FIG. 4), a cover material 34 and a resilient cushioning material 36. The recessed area 26 is defined within the resilient cushioning material 36 and is open to the passenger receiving surface 30.

The metallic frame 32 can be any of a variety of seat frame structures. Only a portion of the metallic frame 32 is shown in FIG. 4. The metallic frame 32 includes a rigid frame that can be rectangular in shape with lattice of structural elements extending from one side to another side thereof. Since rigid seat frame structures are conventional structures, further description is omitted for the sake of brevity. The cover material 34 can be leather, synthetic leather or textile material that surrounds and covers the resilient cushioning material 36. The resilient cushioning material 36 can be any of a variety of materials that provide support and comfort to a passenger seated on the rear seat 12. The resilient cushioning material 36 is attached to and supported by the metallic frame 32 in a conventional manner.

As shown in cross-section in FIG. 4, tether wire 14 is rigidly fixed to the metallic frame 32. More specifically, the tether wire 14 is non-movably fixed relative to the upright cushion portion 24, and moves with the upright cushion portion 24, if the upright cushion portion 24 is moved between an upright orientation (FIGS. 2, 3 and 4) and an inclined orientation (not shown). The tether wire 14 is positioned at a location within the rear seat 12 and is of sufficient diameter and strength so as to support a child seat or other similar structure supported on the rear seat 12 to restrict and/or prevent movement of the child seat in accordance with the IIHS (Insurance Institute for Highway Safety) Vehicle LATCH Hardware Evaluation Protocol (Version II), November 2015, which is incorporated herein by reference in its entirety. The tether wire 14 is further designed and configured to meet the requirements of Federal Motor Vehicle Safety Standard No. 213 (FMVSS No. 213).

As is also shown in FIG. 4, the tether wire 14, the recessed area 26 and the tether cover assembly 16 are all positioned such that the tether wire 14 is easily accessed via the tether cover assembly 16, as is described in greater detail below.

A description of the tether cover assembly 16 is now provided with specific reference to FIGS. 4-9. The tether cover assembly 16 includes a housing 40, a first door 42a and a second door 42b. The housing 40 has an upper wall 44, side walls 46, a lower wall 48, a rear wall 50 and a front opening section 52. The upper wall 44, the side walls 46 and the lower wall 48 are depicted as being solid walls, but can alternatively have gaps or holes to reduce the amount of material used to form the housing 40. The rear wall 50 includes a slot or opening 50a dimensioned to receive the tether wire 14. Specifically, when the housing 40 is installed to the upright cushion portion 24, the housing 40 is pushed into the recessed area 26 such that the tether wire 14 extends into and through the opening 50a.

The housing 40 and the tether wire 14 are dimensioned such that tether wire 14 is a predetermined distance $L_1$ away from the upper wall 44. The tether wire 14 is further a second predetermined distance $L_2$ from the first and second doors 42a and 42b, when in their closed positions. Further, the tether wire 14 is a third predetermined $L_3$ distance away from the lower wall 48. The distances $L_1$, $L_2$ and $L_3$ are all in compliance with the dimensions set forth in the IIHS Vehicle LATCH Hardware Evaluation Protocol (Version II), November 2015 and the requirements of Federal Motor Vehicle Safety Standard No. 213 (FMVSS No. 213). In accordance with the above mentioned protocol and safety standards, a ratio determined by the equation $L_2/(L_1+L_3)$ has a value of between 0.125 and 0.33. Further, in the depicted embodiment, $L_2$ is between 1 cm and 2 cm and $L_1+L_3$ is between 6 cm and 8 cm. It should be understood from the drawings and the description herein that the values of $L_1$, $L_2$ and $L_3$ above are merely examples and are not intended to limit the invention.

At the intersections of the upper wall 44, the rear wall 50, and the side walls 46, and at respective intersections of the lower wall 48, the rear wall 50 and the side walls 46, fastener sections 54 are formed. The fastener sections 54 each include at least one surface that is spaced apart from the rear wall 50 that defines a fastener opening 54a (FIG. 4) with fasteners $F_1$ inserted therethrough for attachment to the resilient cushioning material 36 and/or to a portion (not shown) of the metallic frame 32. The front opening section 52 is basically an overhang or lip that defines a door opening 56. Further, the front opening section 52 serves as a frame surrounding the door opening 56.

Figure 8:
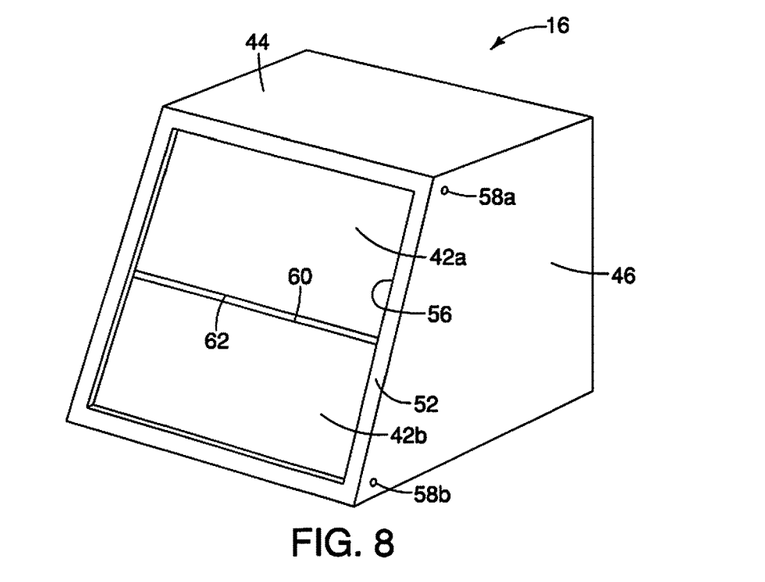
FIG. 8 is a perspective view of the tether cover assembly removed from the seat showing details of the housing and the doors with the doors in a closed position in accordance with the first embodiment.
Figure 9:
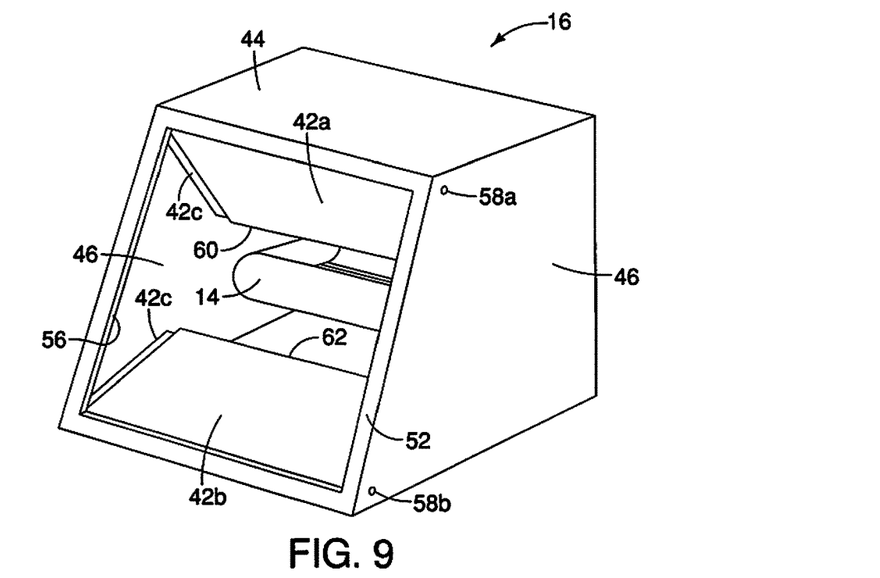
FIG. 9 is another perspective view of the tether cover assembly similar to FIG. 8 showing details of the housing and the doors with the door pivoted to the open position in accordance with the first embodiment.

The first door 42a and the second door 42b are each a generally flat planar element that includes recessed edges 42c. The first door 42a is an upper door pivotally attached to the housing 40 via a pivot shaft 58a adjacent to the upper wall 44. The second door 42b is a lower door pivotally attached to the housing 40 via a pivot shaft 58b adjacent to the lower wall 48. More specifically, the pivot shaft 58a extends between upper areas of the side walls 46 adjacent to the upper wall 44 and the front opening section 52. Similarly, the pivot shaft 58b extends between lower areas of the side walls 46 adjacent to the lower wall 48 and the front opening section 52. Further, the side walls 46 can be provided with apertures that receive ends of respective ones of the pivot shafts 58a and 58b, as shown in FIGS. 8 and 9. The pivot shaft 58a defines a first pivot axis about which the first door 42a pivots. The pivot shaft 58b defines a second pivot axis about which the second door 42b pivots. The pivot shaft 58a and the pivot shaft 58b are parallel to one another. Further, in the depicted embodiment, the pivot shaft 58a and the pivot shaft 58b are horizontally oriented. Hence, the first pivot axis and the second pivot axis are parallel to one another and are horizontally oriented.

Figure 5:
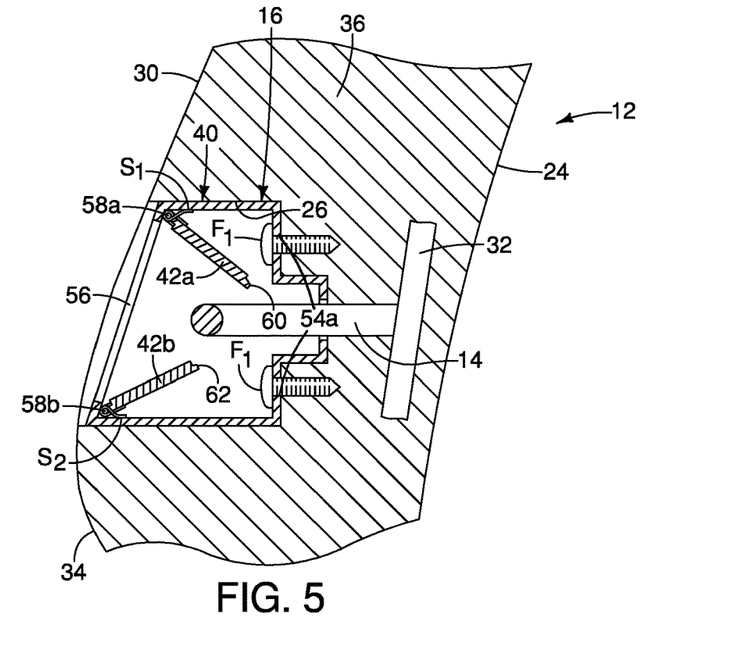
FIG. 5 is another side cross-sectional view of the portion of the rear seat similar to FIG. 4, showing the doors in an at least partially open position in accordance with the first embodiment.
Figure 7:
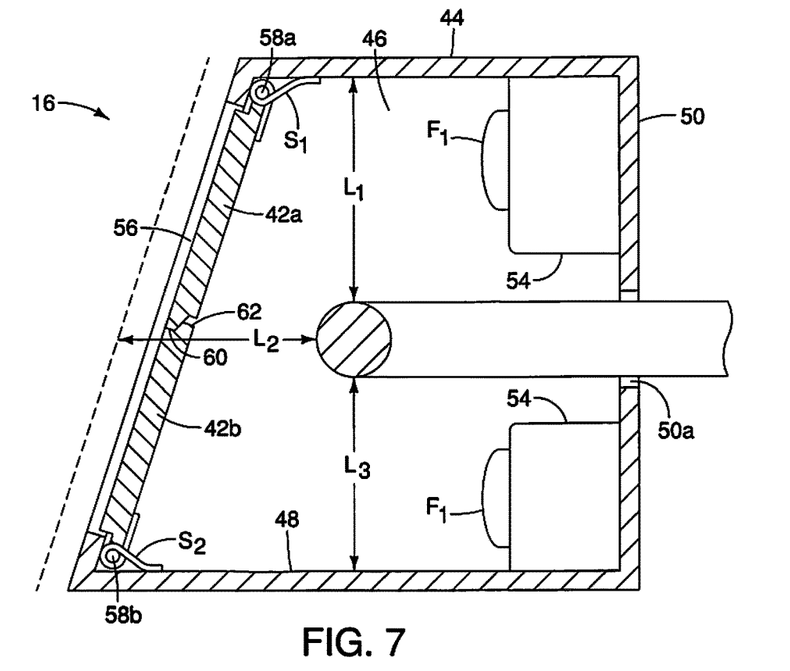
FIG. 7 is a cross-sectional side view of the tether cover assembly taken along the line 7-7 in FIG. 6 in accordance with the first embodiment.

The first door 42a and the second door 42b are configured to move from respective closed positions and respective open positons. The closed positions are shown in FIGS. 4, 7 and 8. In the closed positions, the first door 42a and the second door 42b conceal the tether wire 14 and the door opening 56. The open positions are shown in FIGS. 5 and 9 in which the tether wire 14 and the door opening 56 are exposed. The first door 42a is biased toward the closed position by a spring $S_1$. The second door 42b is biased toward the closed position by a spring $S_2$. The spring constant of the spring Si is preferably greater than the spring constant $S_2$ so that the first door 42a closes more quickly than the second door 42b.

The first door 42a is provided with a lip 60 that extends along a lower end (a lower edge) thereof. The second door 42b is provided with a rounded contour or recessed contour 62 along an upper end (an upper edge) thereof. When the first door 42a and the second door 42b are in their respective closed positions, the lip 60 of the first door 42a overlaps with and covers a portion of the recessed contour 62 of the second door 42b. More specifically, the lip 60 and the recessed contour 62 mate with one another when the first door 42a and the second door 42b are in their respective closed positions, as shown in FIG. 7. As mentioned above, the spring $S_1$ is configured to exert a greater force on the first door 42a than the force exerted by the spring $S_2$ on the second door 42b. Consequently, the first door 42a closes before the second door 42b such that the lip 60 can overlay the recessed contour 62 of the second door 42b providing the housing 16 with little or no gap between the first door 42a and the second door 42b when in their respective closed positions.

Figure 6:
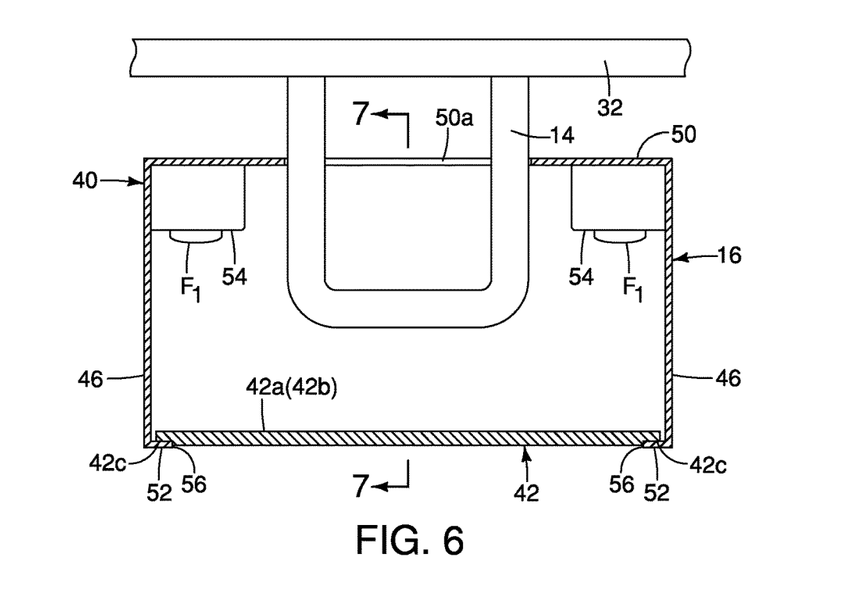
FIG. 6 is a top cross-sectional view of the portion of the tether cover assembly and the tether wire taken along the line 6-6 in FIG. 4, showing the housing and one of the doors of the tether cover assembly in the closed position in accordance with the first embodiment.

The recessed edges 42c of the first door 42a and the second door 42b are provided such that when the first door 42a and the second door 42b are in their respective closed positions, the main portions of the first door 42a and the second door 42b extend into the opening 56 defined by the front opening section 52, as shown in FIG. 6. Put another way, each of the first and second doors 42a and 42b have a first overall thickness and the recessed edges 42c having a second thickness that is less than the first thickness of the door 42.

As is shown in FIGS. 4 and 5, the housing 40 is installed within the recessed area 26 such that with the first and second doors 42a and 42b in their closed positions they coincide with or are parallel to the first plane $P_1$. As shown in FIG. 7, with the first and second doors 42a and 42b in their closed positions, the main portion of the first and second doors 42a and 42b extends at least partially into the opening 56 due to the dimensions of the recessed edges 42c. It should be understood from the drawings and the description herein, that the main portion of the first and second doors 42a and 42b (the areas other than the recessed edges 42c) can be made thicker such that when the first and second doors 42a and 42b are in their respective closed positions, the exposed surfaces of the main portion of the first and second doors 42a and 42b can be flush with the outer or exposed surface of the front opening section 52, or, alternatively, can extend beyond the exposed surface of the front opening section 52.

Movement of the first and second doors 42a and 42b from their closed positions to their open positions includes at respective free ends (the lip 60 and the recessed contour 62) of each of first and second doors 42a and 42b moving away from the first plane $P_1$. Further, the housing 40 and the first and second doors 42a and 42b are completely located within the recessed area 26 and are confined within the resilient cushioning material 26 and bounded by the first plane $P_1$. In other words, the first and second doors 42a and 42b are located along the first plane $P_1$ when closed and are confined within the resilient cushioning material 26 without crossing or moving to an opposite side of the first plane $P_1$.

In the depicted embodiment, an upper front end of the housing 40 and a lower front end of the housing 40 are not vertically aligned. Specifically, when installed into the recessed area 26 of the rear seat 12, the lower front end of the housing 40 is located more forward of the upper front end of the housing 40 in a vehicle longitudinal direction. It should be understood from the drawings and the description herein than inclined orientation of the front opening section 52 of the housing 40 is a function of the overall shapes and contours of the lower end of the upright cushion portion 24 of the rear seat 12. The front opening section 52 can be re-oriented and made more vertical, or inclined with an upper end thereof being more forward in the vehicle longitudinal direction relative than the lower end of the front opening section 52 in accordance with an overall design and shape of the rear seat 12.

In the depicted embodiments the movement of the first and second doors 42a and 42b between their respective closed positions and their respective open positions are confined to movement at a first side of the first plane $P_1$, where the first side of the first plane $P_1$ is a rearward side thereof relative to the longitudinal direction of the vehicle 10. A second side of the first plane $P_1$ is a forward side thereof relative to the longitudinal direction of the vehicle 10. The forward side of the first plane $P_1$ is the space that a passenger occupies when sitting on the rear seat 12 (relative to the recessed area 26 of the rear seat 12). Since the first and second doors 42a and 42b are confined to move within the space defined relative to a second side of the first plane $P_1$, (spaces within the resilient cushioning material 36), the first and second doors 42a and 42b do not cross through the first plane Pi to the second side of the first plane $P_1$ and to the passenger receiving area. In other words, the structure of the housing 40 prevents the first and second doors 42a and 42b from crossing or passing through the first plane $P_1$ to the second side of the first plane $P_1$ and to the passenger receiving area of the rear seat 12.

Second Embodiment

Figure 10:
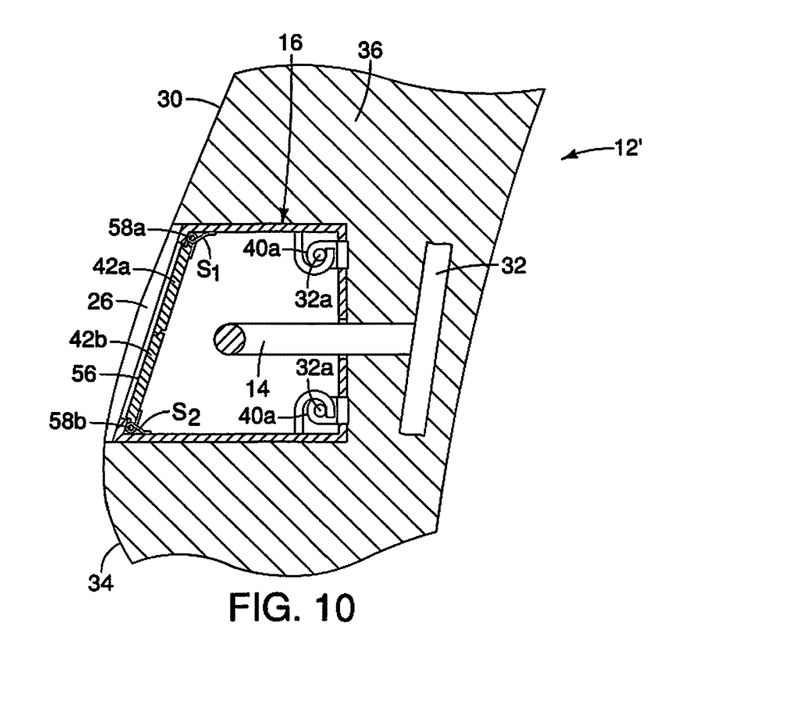
FIG. 10 is a side cross-sectional view of a portion of a rear seat showing a housing and doors of the tether cover assembly secured to the rear seat with an alternative attachment structure in accordance with a second embodiment.

Referring now to FIG. 10, a tether cover assembly 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The tether cover assembly 12' includes the housing 40 and the doors 42a and 42b of the first embodiment. The housing 40 is as described in the first embodiment except that the fastener section 54 of the first embodiment are omitted. Instead, snap fitting projections 40a are fitted to interior surfaces of the housing 40 for snap-fitting engagement with portions 32a of the metallic frame 32 of the rear seat 12. The configuration of the tether cover assembly 12' is an alternative way of installing the housing 40 to the recessed area 26 of the rear seat 12.

The various vehicle elements and structure of the vehicle 10 are conventional components that are well known in the art. Since such vehicle elements are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle seat assembly. Accordingly, these terms, as utilized to describe the present invention should be interpreted relative to a vehicle equipped with the vehicle seat assembly.

The term "configured" as used herein to describe a component, section or part of a device includes structure that is constructed and/or designed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle seat assembly, comprising:
a seat portion having a passenger receiving surface configured and shaped to contact a portion of a passenger seated there-against, at least a portion of the passenger receiving surface coinciding with a first plane, the seat portion having a resilient cushioning material disposed therein with a recessed area being defined within the resilient cushioning material and being open to the passenger receiving surface;
a tether wire for securing child seat located within the recessed area; and
a tether cover assembly having a housing defining a door opening, a first door and a second door, the first door being pivotal about a first pivot axis and the second door being pivotal about a second axis between respective closed positions concealing the tether wire and the door opening and open positions exposing the tether wire and the door opening, each of the first pivot axis and the second pivot axis each being defined by corresponding pivot shafts fixed to the housing adjacent to the door opening, the housing being installed within the recessed area such that with the doors in their respective closed positions the first and second doors are parallel to the first plane.

2. The vehicle seat assembly according to claim 1, wherein
the first pivot axis and the second pivot axis are parallel to one another and are horizontally oriented.

3. The vehicle seat assembly according to claim 1, wherein
the first door includes an overlapping lip that covers a free end of the second door with the first and second doors in their respective closed positions.

4. The vehicle seat assembly according to claim 1, wherein
the housing includes a trim lip that extends around the door opening such that with the first door and the second door in their respective closed positions the trim lip covers at least two peripheral edges of each the first door and the second door.

5. The vehicle seat assembly according to claim 1, wherein
the first door and the second door are each spring biased toward their respective closed positions.

6. The vehicle seat assembly according to claim 1, wherein
the housing attaches to the seat portion via mechanical fasteners.

7. The vehicle seat assembly according to claim 1, wherein
the housing attaches to the seat portion via resilient projections that engage frame portions of the seat assembly.

8. The vehicle seat assembly according to claim 1, wherein
the housing includes a rear wall opposite the door opening, the rear wall having a slot or opening extending therethrough, with the tether wire extending into the housing through the slot or opening.

9. The vehicle seat assembly according to claim 1, wherein
the housing further a first spring and a second spring, the first spring biasing the first door to the closed position and the second spring biasing the second door to the closed position.

10. The vehicle seat assembly according to claim 9, wherein
the first spring has a first spring constant and the second spring has a second spring constant, the first spring constant being greater than the second spring constant such that the first door closes more quickly than the second door.

11. A vehicle seat assembly, comprising:
a seat portion having a passenger receiving surface configured and shaped to contact a portion of a passenger seated there-against, at least a portion of the passenger receiving surface coinciding with a first plane, the seat portion having a resilient cushioning material disposed therein with a recessed area being defined within the resilient cushioning material and being open to the passenger receiving surface, the recessed area and adjacent portions of the seat portion being located on a rearward side of the first plane and a passenger receiving area being located on a forward side of the first plane;
a tether wire for securing child seat located within the recessed area; and
a tether cover assembly having a housing defining a door opening, a first door and a second door, the first door being pivotal about a first pivot axis and the second door being pivotal about a second axis between respective closed positions concealing the tether wire and the door opening and open positions exposing the tether wire and the door opening, each of the first pivot axis and the second pivot axis each being defined by corresponding pivot shafts fixed to the housing adjacent to the door opening, the housing being installed within the recessed area such that movement of the first door and the second door between the closed position and the open position is confined to movement at the first side of the first plane with the door being prevented from crossing through the first plane to the second side of the first plane and to the passenger receiving area.

12. The vehicle seat assembly according to claim 11, wherein
the first pivot axis and the second pivot axis are parallel to one another and are horizontally oriented.

13. The vehicle seat assembly according to claim 11, wherein
the first door includes an overlapping lip that covers a free end of the second door with the first and second doors in their respective closed positions.

14. The vehicle seat assembly according to claim 11, wherein
the housing includes a trim lip that extends around the door opening such that with the first door and the second door in their respective closed positions the trim lip covers at least two peripheral edges of each the first door and the second door.

15. The vehicle seat assembly according to claim 11, wherein
the first door and the second door are each spring biased toward their respective closed positions.

16. The vehicle seat assembly according to claim 11, wherein
the housing attaches to the seat portion via mechanical fasteners.

17. The vehicle seat assembly according to claim 11, wherein
the housing attaches to the seat portion via resilient projections that engage frame portions of the seat assembly.

18. The vehicle seat assembly according to claim 11, wherein
the housing includes a rear wall opposite the door opening, the rear wall having a slot or opening defined therein, with the tether wire extending into the housing through the slot or opening.

19. The vehicle seat assembly according to claim 11, wherein
the housing further a first spring and a second spring, the first spring biasing the first door to the closed position and the second spring biasing the second door to the closed position.

20. The vehicle seat assembly according to claim 19, wherein
the first spring has a first spring constant and the second spring has a second spring constant, the first spring constant being greater than the second spring constant such that the first door close more quickly than the second door.

* * * * *